(12) United States Patent
Murakowski et al.

(10) Patent No.: US 9,817,164 B2
(45) Date of Patent: Nov. 14, 2017

(54) METHOD OF FABRICATING AN OPTICAL GRATING

(75) Inventors: Janusz Murakowski, Bear, DE (US); Shouyuan Shi, Newark, DE (US); Dennis W. Prather, Newark, DE (US)

(73) Assignee: LUMILANT, INC., Newark, DE (US)

( * ) Notice: Subject to any disclaimer, the term of this patent is extended or adjusted under 35 U.S.C. 154(b) by 777 days.

(21) Appl. No.: 13/606,221

(22) Filed: Sep. 7, 2012

(65) Prior Publication Data

US 2013/0140723 A1 Jun. 6, 2013

Related U.S. Application Data

(60) Provisional application No. 61/531,783, filed on Sep. 7, 2011.

(51) Int. Cl.
| | | |
|---|---|---|
| *G02B 5/18* | (2006.01) | |
| *G02B 6/124* | (2006.01) | |
| *G02B 6/02* | (2006.01) | |
| *G02B 6/12* | (2006.01) | |

(52) U.S. Cl.
CPC ........ *G02B 5/1857* (2013.01); *G02B 6/124* (2013.01); *G02B 6/02066* (2013.01); *G02B 2006/12173* (2013.01); *G02B 2006/12176* (2013.01)

(58) Field of Classification Search
CPC .. G02B 5/1857; G02B 6/02066; G02B 6/124; G02B 2006/12173; G02B 2006/12176
See application file for complete search history.

(56) References Cited

U.S. PATENT DOCUMENTS

| 5,413,884 | A | * | 5/1995 | Koch | ................. | G02B 6/12007 |
| | | | | | | 430/321 |
| 6,141,370 | A | * | 10/2000 | Avrutsky et al. | ............ | 372/102 |

OTHER PUBLICATIONS

Ishii et al., "Quasicontinuous Wavelength Tuning in Super-Structure-Grating (SSG) DBR Lasers," IEEE Journal of Quantum Electronics, vol. 32, No. 3, Mar. 1996, pp. 433-441.
Avrutsky et al, "Design of Widely Tunable Semiconductor Lasers and the Concept of Binary Superimposed Gratings (BSG's)," IEEE Journal of Quantum Electronics, vol. 34, No. 4, Apr. 1998, pp. 729-741.
Zhang et al., "Fibonacci quasi-periodic superstructure fiber Bragg gratings," Opt. Int. J. Light Electron. Opt. (2008), doi:10.1016/j.ijleo, Aug. 2008, pp. 1-5.
Avrutsky et al., "Binary superimposed gratings for tunable and multiwavelength semiconductor lasers." SPIE Conference on Physics and Simulation of Optoelectronic Devices VI, San Jose, California, Jan. 1998, SPIE vol. 3283, pp. 894-904.

* cited by examiner

*Primary Examiner* — Mathieu Vargot
(74) *Attorney, Agent, or Firm* — Muir Patent Law, PLLC

(57) ABSTRACT

According to embodiments of the invention, the design and fabrication of a binary superimposed grating (BSG) results in better performing devices that may be fabricated using existing technology. The fabrication process includes forming grating features based upon repeating features of the desired superposition function. The design process also relaxes the processing requirement for equivalently performing devices.

18 Claims, 1 Drawing Sheet

METHOD OF FABRICATING AN OPTICAL GRATING

PRIORITY

Priority is claimed to U.S. provisional application No. 61/531,783, filed Sep. 7, 2011, the disclosure of which is incorporated herein by reference in its entirety.

BACKGROUND OF THE INVENTION

1. Field of the Invention

The field of the invention may relate to methods for designing grating patterns with predetermined reflectivity spectra and the fabrication of optical gratings from such designs.

2. Background

In optics, and in particular in integrated optics, it is often desired to have a reflector with a predetermined reflectivity spectrum. One way to realize such a reflector is by designing a grating on a waveguide such that the reflectivity of the grating matches that of the required reflectivity spectrum. A conventional binary superimposed grating (BSG) is a convenient and elegant device for achieving such reflectors. The reflectivity spectrum of the BSG is tailor-designed for a particular application such as highly-selective filter or a tunable laser. In such applications, it is important to achieve high reflectivity at accurately predetermined wavelengths.

The design of the conventional BSG starts with defining a function which is a superposition of spatial sine functions having spatial frequencies equal to the spatial frequencies that the grating is being designed to reflect. The phases and amplitudes of the sine functions are chosen for the best performance of the grating, in a manner that is well-known to those of skill in the art. Hence, the defined function is:

$$\psi(x) = \sum_{n=1}^{N} A_n \sin(k_n x + \varphi_n), \quad (1)$$

where $k_n$ are the spatial frequencies corresponding to the wavelengths that the grating is being designed to reflect, and $A_n$ and $\phi_n$ are the amplitudes and phases, respectively, of the sine functions that are selected for the best performance of the grating. FIG. 1(a) illustrates a short section of an example of $\psi(x)$.

Since the continuous profile described by Eq. (1) is difficult to achieve at optical-wavelength scales using conventional methods of micro and nano-fabrication, the design methods of the conventional BSG starts with converting $\psi(x)$ to a binary, or two-level, profile, such as is shown in FIG. 1(b). This is conventionally done by applying a threshold function to $\psi(x)$. Furthermore, since the minimum feature size that can be fabricated is predetermined for any particular technology chosen to fabricate the BSG, the pattern is further distorted to accommodate this constraint, as is shown in FIG. 1(c). The pattern shown in FIG. 1(c) is the pattern that is fabricated as a grating in a waveguide to achieve the reflectivity spectrum defined by the spatial frequencies $k_n$.

The shortcomings of the conventional BSG as described above stem from two factors: (1) the distortion of the exposed pattern due to the minimum feature size available by use of any particular chosen technology and (2) from the fact that the feature size varies along the waveguide. The first factor contributes to the shift of the reflected spectral lines and line broadening, and is introduced at the design stage. The second factor contributes to line broadening and shift due to aspect-ratio dependent etching, in which narrow features typically etch slower than wider features in a diffusion-limited etch process. This results in a variable etch depth and consequently inconsistent effective index of the etched regions, which compromise device performance.

SUMMARY OF THE INVENTION

Embodiments of the invention may provide a method of designing a grating pattern with predetermined reflectivity spectrum such that the lines of the grating have uniform width or uniform depth, and their placement is such that the required reflectivity spectrum is achieved. Other embodiments of the invention may provide methods of fabricating gratings from such grating patterns.

The fabrication method may include the steps of:
1. determining placement for grating features according to a position of repeating features in a desired superposition function; and
2. fabricating the grating using a fabrication tool to form the grating features on or as part of a substrate according to the determined placement, wherein the grating features have at least one of a uniform width and a uniform depth Advantages of the improvements will be apparent from the drawings and the description of the preferred embodiment.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
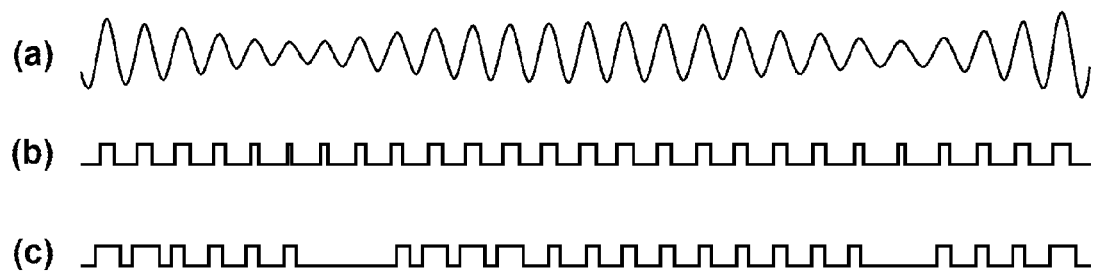
FIG. 1 schematically illustrates steps of creating a grating pattern from a superposition function according to the prior art.

Embodiments of the current invention may provide new methods for fabrication of BSGs. In a first embodiment, the repeating features are the positions of local minima of the function $\psi(x)$, as shown in FIG. 1(a), may be used to place features of identical widths. The width of the grating features may be determined by the minimum feature size of the particular technology used to fabricate the device. Since the feature placement accuracy of many technologies that may be used to create the grating features is typically much better than the minimum feature size, unlike methods of the prior art, the quality of the BSG that is fabricated may be dependent upon the placement accuracy of the grating features instead of the accuracy of the feature size. For example, in electro-beam (e-beam) lithography, the minimum feature size that can be reliably realized is about 50 nm, limited by the spot size, accelerating voltage, resist thickness, resist type, etc. Feature placement, on the other hand, can be as accurate as 0.1 nm if a high quality beam deflection system is used.

Figure 2:
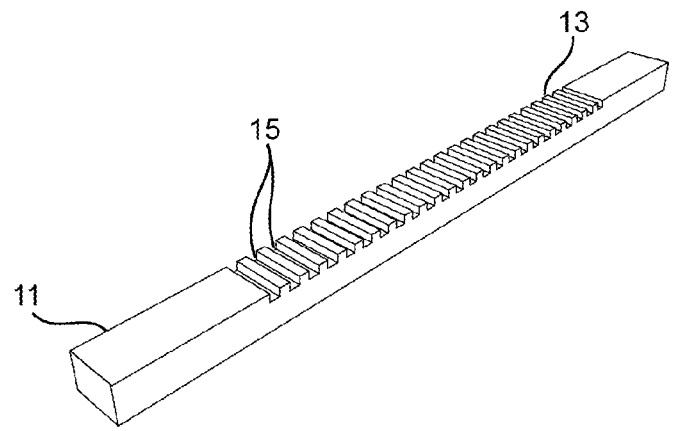
FIG. 2 illustrates an optical waveguide according to an embodiment of the present invention.

FIG. 2 shows an example of an optical waveguide 11 with a grating 13 incorporated into one surface. The grating has grating features 15 which have identical widths and depths, with the placement of the grating features 15 being determined according to the process described above.

An additional benefit is that with the approach described above, the demands placed on the lithography in terms of resolution and the minimum grating feature size may be relaxed as compared to the conventional approach. This is because the exposed grating features in the present method can be considerably wider than the minimum grating feature size in the conventional design required to obtain comparable device performance. For example, in the conventional design, it may be necessary to expose grating features as small as 30 nm, and integer multiples thereof, in order to obtain a certain level of device performance. In the present method, 100 nm grating features placed with 1-nm accuracy may provide a considerably better device performance than the conventional design.

A lithography tool that may be used to realize structures described herein is a fixed beam moving stage (FBMS) module as part of an electron-beam lithography system, such as those available from Raith USA, Inc., of Ronkonkoma, N.Y. With this fabrication equipment, grating features can be placed with sub-nanometer precision over many millimeters of length, and the placement precision is far better than the minimum grating feature size. Other tools that are capable of creating or fabricating the grating features of the BSG may also be used.

The available precision in grating feature placement may yield greater precision in determining the reflected wavelength, which in turn may result in reduced spectral shift and minimized line broadening. Furthermore, since the etched regions may be fabricated having uniform widths for the grating features, the resulting etch depth may be more uniform, which may further improve the line width of the reflected spectrum as compared to the conventional design of BSGs.

While the example of a BSG was used to make the discussion more concrete, other approaches may be used to define the position of the features based on the defining superposition function. For example, local maxima may be used instead of local minima. Those skilled in the art will recognize that other features of the superposition function or a different scheme entirely may be used for determining feature placement.

The method described herein may allow the high precision of grating feature placement to be exploited. For a given fabrication technology, the grating feature placement precision is typically finer, and depending upon the technology, finer by at least an order of magnitude, than the minimum grating feature size that can be realized. At the same time, in the method described herein, the smallest grating feature may be as small as the minimum width the particular fabrication tool is capable of, which can be relatively large, thereby relaxing fabrication requirements.

The foregoing description of the invention illustrates and describes embodiments of the present invention. It is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein.

What is claimed is:

1. A method of fabricating a reflector to reflect light of predetermined wavelengths, the reflector comprising an optical waveguide having a binary superimposed grating formed on a surface of the optical waveguide, the method comprising:
   etching a first surface area of the optical waveguide to form a plurality of parallel grooves into the first surface area of the optical waveguide, wherein all of the parallel grooves have a first width as measured in the first direction and a first depth as measured in a second direction perpendicular to the first direction,
   wherein a position of each of the plurality of parallel grooves corresponds to a position of a corresponding repeating feature of a superposition function, the superposition comprising the sum of a plurality of sinusoidal functions, where each sinusoidal function has a spatial frequency corresponding to one of the predetermined wavelengths of light to be reflected by the binary superimposed grating of the optical waveguide.

2. The method of claim 1, wherein the first width is about 100 nm.

3. The method of claim 1,
   wherein the grooves are etched using a fabrication tool,
   wherein the first width is equal to a minimum feature size s of the fabrication tool.

4. The method of claim 3, wherein the fabrication tool comprises an electron-beam lithography system.

5. The method of claim 1,
   wherein the grooves are etched using a fabrication tool, and
   wherein a placement precision dp of the grooves etched into the surface area of the optical waveguide is equal to the feature placement precision p of the fabrication tool.

6. The method of claim 5, wherein the placement precision dp is less than or equal to 1 nm.

7. The method of claim 5, wherein the placement precision dp is about 0.1 nm.

8. The method of claim 1, wherein the superposition function comprises:

$$\psi(x) = \sum_{n=1}^{N} A_n \sin(k_n x + \varphi_n),$$

where N is an integer greater than 1, $k_n$ is the spatial frequency of a wavelength to be reflected by the grating, $A_n$ is an amplitude of the sinusoidal function of $k_n$ and $\varphi_n$ is a phase of the sinusoidal function of $k_n$.

9. The method of claim 8, wherein the repeating feature is a local minima of the superposition function.

10. The method of claim 8, wherein the repeating feature is a local maxima of the superposition function.

11. The method of claim 1, wherein the repeating feature is a local minima of the superposition function.

12. The method of claim 1, wherein the repeating feature is a local maxima of the superposition function.

13. A method of fabricating a reflector to reflect light of predetermined wavelengths, the reflector comprising an optical waveguide having a binary superimposed grating formed on a surface of the optical waveguide, the method comprising:
   etching a first surface area of the optical waveguide to form a plurality of grating features into the first surface area of the optical waveguide, wherein all of the grating features have a first width as measured in the first direction and a first depth as measured in a second direction perpendicular to the first direction, wherein a position of each of the plurality of grating features corresponds to a position of a corresponding repeating feature of a superposition function, the superposition comprising the sum of a plurality of sinusoidal functions, where each sinusoidal function has a spatial frequency corresponding to one of the predetermined wavelengths of light to be reflected by the binary superimposed grating of the optical waveguide.

14. The method of claim 13, wherein the superposition function comprises:

$$\psi(x) = \sum_{n=1}^{N} A_n \sin(k_n x + \varphi_n),$$

where N is an integer greater than 1, $k_n$ is the spatial frequency of a wavelength to be reflected by the grating, $A_n$ is an amplitude of the sinusoidal function of $k_n$ and $\phi_n$ is a phase of the sinusoidal function of $k_n$.

15. The method of claim 14, wherein the repeating feature is a local minima of the superposition function.

16. The method of claim 14, wherein the repeating feature is a local maxima of the superposition function.

17. The method of claim 13, wherein the repeating feature is a local minima of the superposition function.

18. The method of claim 13, wherein the repeating feature is a local maxima of the superposition function.

* * * * *